(12) United States Patent
García-Tapia et al.

(10) Patent No.: US 8,567,481 B2
(45) Date of Patent: Oct. 29, 2013

(54) METHOD AND COMPOSITION OF BINDER FOR MANUFACTURING SAND MOLDS AND/OR CORES FOR FOUNDRIES

(75) Inventors: Gilberto García-Tapia, Coahuila (MX); Satish Jhaveri, Oakville (CA); Aldo Alberto Sáenz-Valadez, Nuevo León (MX); Abraham Velasco-Téllez, Nuevo León (MX); Emma Lizzet Cedillo-Saucedo, Nuevo León (MX); José Talamantes-Silva, Nuevo León (MX)

(73) Assignee: Tenedora Nemak, S.A. de C.V., Garcia, Nuevo Leon (MM)

( * ) Notice: Subject to any disclaimer, the term of this patent is extended or adjusted under 35 U.S.C. 154(b) by 0 days.

(21) Appl. No.: 13/141,023

(22) PCT Filed: Dec. 18, 2009

(86) PCT No.: PCT/US2009/068670
§ 371 (c)(1),
(2), (4) Date: Jan. 11, 2012

(87) PCT Pub. No.: WO2010/080583
PCT Pub. Date: Jul. 15, 2010

(65) Prior Publication Data
US 2012/0098157 A1   Apr. 26, 2012

(30) Foreign Application Priority Data
Dec. 18, 2008   (MX) .................... MX/a/2008/016384

(51) Int. Cl.
*B22C 1/18* (2006.01)
*B22C 1/20* (2006.01)

(52) U.S. Cl.
USPC ........ 164/527; 164/528; 106/38.3; 106/38.35

(58) Field of Classification Search
USPC ................. 164/525, 526, 527, 528; 106/38.3, 106/38.35
See application file for complete search history.

(56) References Cited

U.S. PATENT DOCUMENTS

| | | | |
|---|---|---|---|
| 4,070,196 A | 1/1978 | Kraak et al. | |
| 4,226,277 A | 10/1980 | Matalon | |
| 4,329,177 A | 5/1982 | George | |
| 4,763,720 A | 8/1988 | Sakamoto et al. | |
| 5,089,186 A | 2/1992 | Moore et al. | |
| 5,248,552 A | 9/1993 | Moore et al. | |
| RE35,334 E | 9/1996 | Moore et al. | |

FOREIGN PATENT DOCUMENTS

| | | |
|---|---|---|
| GB | 1 207 101 | 9/1970 |
| GB | 2 242 683 | 10/1991 |
| WO | WO 2005/012452 | 2/2005 |

*Primary Examiner* — Kevin P Kerns
(74) *Attorney, Agent, or Firm* — A. Thomas S. Safford; Frommer Lawrence & Haug

(57) ABSTRACT

A binder for the production of sand cores and/or molds for foundries that includes sand mixed with an alkyl silicate, preferably tetraethyl silicate; an aqueous solution of an alkali metal silicate, preferably sodium silicate, which solution also contains an alkali metal hydroxide, preferably sodium hydroxide, where the ingredients in such mixture are preferably in given percentage ranges and are mixed until the sand shows a homogeneous aspect and constitution. Also method of manufacturing sand molds for foundries that includes mixing foundry sand with the aforementioned binder, blowing the sand mixed with the binder, having still between 0.5% to 2.5% of water, into a cold box by means of air that is at room temperature, and once the cold box mold has been filled with the sand, passing a hot air current through the sand to dry and harden the binder thus obtaining the foundry mold.

23 Claims, No Drawings

METHOD AND COMPOSITION OF BINDER FOR MANUFACTURING SAND MOLDS AND/OR CORES FOR FOUNDRIES

FIELD OF THE INVENTION

The present invention relates to the technical area of metal casting in molds and more particularly to manufacturing sand molds and/or cores for casting light metals, such as aluminum and magnesium; and more particularly, to a manufacturing system of sand molds and/or cores based on the use of a binder based on an alkali metal silicate, starch and other additives which system provides a number of advantages over the binders currently utilized.

As used in this application, the word "mold" shall be inclusive of core (unless explicitly stated, or clearly indicated from the context, to not be so inclusive).

BACKGROUND OF THE INVENTION

The binders used for manufacturing sand molds for foundries currently used have a number of drawbacks regarding the environment and their associated capital and operational costs which require long manufacturing times and also cause problems in the elimination of sand from the metal castings after solidification in the molds.

The binders currently used are based typically on phenol resins and polyisocyanates which do not require heat for curing or hardening, but instead need catalysts and chemicals, for example amines (such as triethylamine) or carbon dioxide. Handling these materials however cause health and safety problems, because the heat of the cast metal in the molds produce toxic vapors and gases. There exist also other binders containing furans which are cured by reaction with sulfur dioxide similarly causing environmental problems.

There is a need in the aluminum and other light metal foundry industry (especially for automotive and aviation aluminum castings) for a sand binder which overcomes the disadvantages of the current binders; while also being of low material cost, not emitting toxic gases, and being utilized at low operational cost (with regard to reducing the energy used for its curing and for its elimination after solidification of the cast products).

There are several proposals already in the market for binders based on sodium silicate and a carbohydrate, which are soluble in water and which do not show the environmental problems of the phenol and urethane resins. However, these prior silicate based binders unsatisfactorily lack or are insufficient in regard to other important desirable properties. For example, the prepared sand incorporating such binders lacks a suitable fluidity for the sand to flow effectively when blown by air into the mold forms (where the sand takes the predetermined geometric shape). Additionally, the binding strength of the resulting molds and/or cores tends to be insufficient in the mechanical strength needed to withstand the handling and pressure of the liquid metal in order to maintain their precise dimensions. Also such prior sand molds tend not to be easily destroyed after solidification of the molten metal (as needed to allow for efficient sand reclaiming and recycling).

The above-mentioned desirable qualities missing from such prior art is provided by the binder of the present invention, which comprises the following ingredients: (1) an alkali metal silicate (e.g. NaSiO2); (2) an alkali metal hydroxide (e.g. NaOH); (3) a starch (e.g. corn &/or tapioca starch); (4) an alkyl silicate (e.g. tetraethyl silicate); and (5) water.

Some of the publications of the prior art found in connection with the present invention are the following:

U.S. Pat. No. Re 35334, which is a reissue of U.S. Pat. No. 5,089,186 granted to Moore et al, describes a method that eliminates the sand core of a molded product that can be formed from plastic or metal, where the sand is bound by a binder composed of an alkali silicate and a carbohydrate, which can be a saccharin or a starch. The binder used is cured by heat. The core and the product are exposed to water, preferably hot water in a bath or steam for its rapid disintegration and elimination from the molded product.

U.S. Pat. No. 5,248,552 describes a sand core bound with sodium silicate and a carbohydrate which can be a starch. This patent is a divisional application of U.S. Pat. No. 5,089,186 described above, and claims a sand core, whereas the prior patent claims the method to eliminate the sand core from the molded metallic or plastic product.

U.S. Pat. No. 4,070,196 describes a foundry mold and core composition whose disintegration is favored by adding a hydrolyzed starch with the sodium silicate. The hydrolyzed starch has a dextrose equivalent of less than 5.

U.S. Pat. No. 4,226,277 describes a sodium silicate binder that also comprises additives such as alumina, borax, clays, kaolin, bentonite, iron oxide and graphite. It also suggests adding sugars such as dextrose, glucose, and other polysaccharides. This patent does not suggest adding an alkyl silicate nor starch mixtures in the binder composition. Although it mentions the use of hot air to cure the sand probes, the binder composition is very different.

U.S. Pat. No. 4,329,177 describes the composition of an aqueous solution useful to manufacture sand cores for foundries that is obtained by mixing an alkali silicate and a water soluble carbohydrate (monosaccharides, polysaccharides and their derivates). It also includes urea. This binder is cured with $CO_2$ which has disadvantages in respect to the curing process that only required heat. This patent also does not suggest the utilization of an alkyl silicate in the binder composition.

U.S. Pat. No. 4,763,720 describes the manufacturing of a sand mold that is easily disintegrated, in which the sand is bound by two binders: an inorganic one that is sodium silicate, and an organic one that is a starch. The starch and water are mixed first and are then added to the sand along with the silicate. The core is preferably cured by microwaves. This patent however does not mention or suggest the use of an alkyl silicate, nor does it suggest the use of hot air to harden the binder used in the processes and equipment currently used in the industry.

None of the patents mentioned above suggest adding an alkyl silicate to the binder composition, nor suggest the use of hot air in a cold box process with the tooling and equipment currently used with phenol-urethane binders to harden the core or mold formed.

The patents mentioned above mention only two of the basic ingredients of the present invention, and no prior art has been found that shows the use of an alkyl silicate in combination with sodium silicate and sodium hydroxide, and a binder as in the present invention.

The binder here claimed gives the resulting sand and binder mixture qualities of fluidity, mechanical resistance and ease of sand elimination after the metal solidification, such as to provide these several significant advantages over the seemingly similar processes currently used to manufacture molds and cores.

OBJECT OF THE INVENTION

Therefore it is an object of the present invention to provide a binder for the manufacture of sand molds and cores for foundries that is low in cost and benign to the environment, where the current cold box tooling already installed in foundries that use phenolic and/or polyurethane binders can readily be utilized.

It is another object of the present invention to provide sand molds and/or cores for non-ferrous metal casting that offer many advantages over the molds and cores currently used in the automotive and aviation industry, in view of their low fabrication cost and the fact that they are environmentally friendly.

The objects of the present invention are obtained in general by providing a binder for the production of sand cores and/or molds for foundries that comprises mixing, for a period of time between 40 to 60 seconds, said sand with an alkyl silicate, preferably tetraethyl silicate, in a proportion of 0.2% to 1.5% by weight of the total weight of the sand; adding an aqueous solution of an alkali metal silicate, preferably sodium silicate which also contains sodium hydroxide, in a proportion of 1.0% to 2.5% by weight of the total weight of the sand, and mixing them for a period of time between 35 to 50 seconds, (wherein this aqueous silicate solution in a preferred embodiment contains between 85% to 95% of sodium silicate, between 2% to 6% of sodium hydroxide, and between 4% to 13% of water), and finally mixing all of the above until the sand shows a homogeneous aspect and constitution.

The objects of the present invention are also met by a method of manufacturing sand molds for foundries that comprises mixing foundry sand with the present invention binder, blowing the sand mixed with the binder, having still between 0.5% to 2.5% of water, into a cold box by means of air that is at room temperature, and once the cold box mold has been filled with the sand, passing a hot air current through the sand to dry and harden the binder thus obtaining the molds for foundry.

DETAILED DESCRIPTION OF PREFERRED EMBODIMENTS OF THE INVENTION

The preferred forms of this invention that are described in this specification mainly refer to its application in the aluminum alloys foundry industry, however it will be evident that the invention in its broader aspects can also be applicable in other non-ferrous metal foundry industries and plastic molding.

The binder here claimed comprises the following elements: (1) 0.2% to 1.5% of an alkyl silicate, e.g. tetraethyl silicate; (2) 1.0% to 2.5% of an alkali metal silicate solution, e.g. sodium silicate that also contains sodium hydroxide; (3) 1.0% to 2.5% of a mixture/solution of a starch, e.g. corn or tapioca starch; and (4) 0.5% to 2.5% of water. All percentages are by sand weight.

More particularly, the binder here claimed comprises:
(1) from 0.2% to 1.5% of an alkyl silicate;
(2) from 1.0% to 2.5% of a silicate/hydroxide solution/mixture having from 85% to 95% based on the solution/mixture being an alkali metal silicate, from 2% to 6% based on the solution/mixture being an alkali metal hydroxide, and from 4% to 8% based on the solution/mixture being water;
(3) from 1.0% to 2.5% of a solution/mixture of starch in water having from 70% to 85% of the starch solution/mixture being water and from 15% to 30% of the starch solution/mixture being starch; and
(4) from 0.5% to 2.5% of water, all the water in said composition being included within said 0.5% to 2.5% range;

all the forgoing percentages refer to the weight of sand with which the composition is to be used; except where otherwise stated.

As used in this application "solution/mixture" is inclusive of a solid either in liquid suspension as a mixture and/or at least partially or wholly dissolved into solution in such liquid.

The sand utilized is preferably silicate sand because of its low cost, but other types of sand can be used such as zirconium, olivine, cromite and their mixtures. Other granular refractory materials can be used for particular applications. This is a significant advantage of the present invention, because other sodium silicate based binders are not apt to be used with sands that do not have a pH close to 7. Sand pH and ADV (acid demand value) are parameters that are not relevant for the utilization of the present invention binder. These foregoing sands and equivalent refractory materials are collectively referred to in this application as "foundry sand."

The alkali metal silicate is preferably sodium silicate although potassium silicate can also be used. Sodium silicate is preferably used in a solution with a solids concentration of between 30% and 50% and having a Na/Si ratio between 1.75 and 2.50, preferably 2.0.

The alkyl silicate is preferably tetraethyl silicate, also known as condensed ethyl silicate, tetra-ethyl-orto-silicate, and tetraethoxysilane. This tetraethyl silicate contributes to the starch binder such that the sand treated with the resulting binder has better fluidity, and also protects against ambient humidity, so that the mold formed in conformity to the present invention maintains its mechanical resistance and dimensionality for an extended period of time even if exposed to ambient humidity.

The starch is preferably corn starch, but potato, tapioca, wheat and rice starch can also be used.

In one particular form of the present invention it is preferred to use a mixture of corn starch and tapioca starch. It is preferred to use more corn starch than tapioca starch. Corn starch is preferably used in a modified version, and the tapioca starch is preferably used in its native version. Corn starch is mixed in a proportion of 50% to 90% with 10% to 50% of tapioca starch, and the rest of the mixture is water. If an aqueous solution of starch is made with this mix, it is preferred to have from 15% to 20% of corn starch and from 5% to 10% of tapioca starch and from 70% to 85% of water.

The process of preparing the sand with the binder in conformity with the present invention comprises the steps of mixing, for a period of time of at least 40 and at most 60 seconds, said sand with an alkyl silicate, preferably tetraethyl silicate, in a proportion of 0.2% to 1.5% in weight by sand weight; adding an aqueous solution of an alkali metal silicate, preferably sodium silicate that also contains sodium hydroxide, in a proportion of 1.0% to 2.5% in weight by sand weight, and mixing them for a period of time of at least 35 and at most 50 seconds (where this aqueous solution contains between 85% and 95% of sodium silicate, between 2% and 6% of sodium hydroxide, and between 4% and 13% of water), and finally mixing the above until the sand has a homogeneous aspect and constitution.

This sand treated with the binder, referred to in this application as "prepared sand." The prepared sand, still having between 0.5% and 2.5% of water, is air blown into a cold box by means of room temperature air and once the cold box has been filled with the sand a hot air current is driven through to dry and harden the binder thus obtaining the sand core with enough mechanical resistance as to be used in casting of metals such as aluminum and manganese alloys.

As previously indicated, one of the advantages of the present invention is that the method and binder here claimed can be applied in the fabrication of sand cores and/or molds in the automotive and aeronautic industries using the cold box tooling that are currently being used in conjunction with phenolic or polyurethane binders, thus avoiding expensive investments in core molds specially prepared for example for the application of microwaves or heat induced by electric resistances embedded in said molds (hot box processes).

Another significant advantage of the present invention is that it provides cores and/or molds with high mechanical resistance to handling so that they maintain their dimensional stability and precision before and after they are filled with molten metal, while being easily disintegrated by exposure to water, hot water or steam. This ease of disintegration of the molds saves energy and time in the overall process that currently is used in destroying the cores by means of impact and vibration stations of the manufactured pieces, or that require intense heat to burn off the phenolic or polyurethane binders with the consequent environmental contamination by smoke and foul vapors that in some cases are toxic.

The sand treated with the present invention binder has a longer shelf life (over a number of days), while the sand mixed with prior sodium silicate based binders has a shelf life of minutes. This means that in a period of time not spanning an hour the sand with silicate binders found in prior art starts to react and harden.

EXAMPLE

A non limiting example of a preferred method and composition of the binder from the present invention is described:

According to the standard method published in the AFS 3315-00-S "Mold and Core Test Handbook" 3$^{rd}$ edition, measurements where taken of the resistance to tension of the bound sands with a prior art representative phenol-urethane binder currently being used in the industry, in a "cold box" process with a blowing time of 2.0 seconds and a blow pressure of 90 psi. An amine was then applied for 5.0 seconds to cure the binder, and thereafter the box was purged for 10.0 seconds, yielding the following results:

| % of Binder by sand weight | Probes | Resistance to tension (psi) Immediate | Resistance to tension (psi) ½ hour later | Resistance to tension (psi) 1.0 hours later |
| --- | --- | --- | --- | --- |
| 0.8 | 1 | 127.8 | 202.2 | 187.6 |
| 0.8 | 2 | 136.0 | 195.4 | 197.6 |
| 0.8 | 3 | 139.6 | 169.2 | 183.6 |
|  | Average | 134.5 | 188.9 | 189.6 |
| 0.8 | 4 | 109.0 | 187.6 | 171.4 |
| 0.8 | 5 | 118.6 | 183.8 | 191.6 |
| 0.8 | 6 | 129.8 | 169.8 | 198.4 |
|  | Average | 124.4 | 185.1 | 193.0 |
|  | Total Average | 131.2 | 187.1 | 189.1 |

A binder was prepared in conformity to the present invention and it was mixed with silicate sand and the resulting sand was blown into a "cold box". The binder was "cured" with a hot air current that was driven through each of the probes at a temperature of 120° C. for 3 minutes, which dried them completely.

Resistance to tension was measured in each probe yielding the following results:

| % of each ingredient in the present invention binder | Probes | Resistance to tension (psi) Immediate | Resistance to tension (psi) ½ hour later | Resistance to tension (psi) 1.0 hours later |
| --- | --- | --- | --- | --- |
| Tetraethyl silicate 0.5% | 1 | 198.4 | 208.6 | 211.2 |
| A solution of silicate and sodium hydroxide 1.75% | 2 | 199.2 | 204.2 | 190.8 |
| Corn and tapioca starch 1.75% | 3 | 199.6 |  |  |
|  | Average | 199.1 | 206.4 | 201.0 |
| Tetraethyl silicate 0.5% | 1 | 149.6 | 172.0 | 166.0 |
| A solution of silicate and sodium hydroxide 1.75% | 2 | 199.2 | 179.8 | 154.4 |
| Corn and tapioca starch 1.75% | 3 | 198.0 | 168.8 | 186.4 |
|  | Average | 182.3 | 173.5 | 168.9 |
|  | Total Average | 190.7 | 190.0 | 185.0 |

This example shows the advantage that the present invention method and binder gives in respect to the prior art, as the resistance to tension shown in each test, and therefore the resistance to tension in sand cores and/or molds that are created in conformity with the present invention will be greater than that of cores and molds made with the representative prior art.

It is to he understood that in this specification only certain forms of the present invention have been described for the purpose of illustrating its principles and preferred forms, as to gain better understanding of the principles and applications of the present invention and in no way do they limit its scope. It is also understood that those known in the art that read the present description can propose other forms and variants without parting from the spirit and scope of the present invention, which is defined solely by the following claims.

We claim:

1. Binder composition for manufacturing foundry sand molds, comprising an alkali metal silicate; an alkali metal hydroxide; starch; an alkyl silicate and water, wherein said composition in weight percentage further comprises:
   (1) from 0.2% to 1.5% of an alkyl silicate based on the weight of sand used in the composition;
   (2) from 1.0% to 2.5% of a silicate/hydroxide solution/mixture based on the weight of sand used in the composition and having from 85% to 95% based on the solution/mixture being an alkali metal silicate, from 2% to 6% based on the solution/mixture being an alkali metal hydroxide, and from 4% to 8% based on the solution/mixture being water;
   (3) from 1.0% to 2.5% of a solution/mixture of starch in water based on the weight of sand used in the composition and having from 70% to 85% of the starch solution/mixture being water and from 15% to 30% of the starch solution/mixture being starch; and
   (4) from 0.5% to 2.5% of water, all the water in said composition being included within said 0.5% to 2.5% range.

2. Binder composition according to claim 1, wherein said alkali metal silicate is sodium silicate.

3. Binder composition according to claim 2, wherein said alkali metal hydroxide is sodium hydroxide.

4. Binder composition according to claim 3, wherein said starch is corn starch.

5. Binder composition according to claim 3, wherein said starch is tapioca starch.

6. Binder composition according to claim 3, wherein said solution/mixture of starch comprises from 15 weight % to 20 weight % of modified corn starch;
from 5 weight % to 10 weight % of native tapioca starch and from 70 weight % to 85 weight % of water.

7. Binder composition according to claim 6, wherein said alkyl silicate is tetraethyl silicate.

8. Prepared sand for fabrication of casting molds using foundry sand, which has been prepared by mixing said foundry sand with a binder composition according to claim 7.

9. Prepared sand according to claim 8, wherein said foundry sand is silica sand.

10. Prepared sand according to claim 8, wherein said foundry sand is zirconium sand.

11. Binder composition according to claim 3, wherein said alkyl silicate is tetraethyl silicate.

12. Binder composition according to claim 11, wherein said starch is corn starch.

13. Binder composition according to claim 8, wherein said starch is tapioca starch.

14. Prepared sand for fabrication of casting molds using foundry sand, which has been prepared by mixing said foundry sand with a binder composition according to claim 1.

15. Prepared sand according to claim 14, wherein said foundry sand is silica sand.

16. Prepared sand according to claim 14, wherein said foundry sand is zirconium sand.

17. Binder composition according to claim 1, wherein said alkyl silicate is tetraethyl silicate.

18. Binder composition according to claim 1, wherein said alkali metal hydroxide is sodium hydroxide.

19. Binder composition according to claim 1, wherein said alkali metal hydroxide is sodium hydroxide and wherein said alkali metal silicate is sodium silicate.

20. Binder composition according to claim 1, wherein said alkyl silicate is tetraethyl silicate and wherein said alkali metal silicate is sodium silicate.

21. Binder composition according to claim 20, wherein said solution/mixture of starch comprises from 15 weight % to 20 weight % of modified corn starch; from 5 weight % to 10 weight % of native tapioca starch and from 70 weight % to 85 weight % of water.

22. Binder composition according to claim 1, wherein said alkyl silicate is tetraethyl silicate and wherein said alkali metal hydroxide is sodium hydroxide.

23. Binder composition according to claim 22, wherein said solution/mixture of starch comprises from 15 weight % to 20 weight % of modified corn starch; from 5 weight % to 10 weight % of native tapioca starch and from 70 weight % to 85 weight % of water.

* * * * *